United States Patent [19]

Akatsu

[11] Patent Number: 5,165,325
[45] Date of Patent: Nov. 24, 1992

[54] CONTINUOUS PRESSURIZING APPARATUS FOR LIQUID

[75] Inventor: Makoto Akatsu, Hiroshima, Japan

[73] Assignee: Mitsubishi Jukogyo Kabushiki Kaisha, Tokyo, Japan

[21] Appl. No.: 858,948

[22] Filed: Mar. 27, 1992

[51] Int. Cl.$^5$ .................... A47J 31/00; A23L 3/00; C12H 1/00

[52] U.S. Cl. ................................ 99/275; 99/453; 99/467; 99/485; 99/516; 422/39; 422/112

[58] Field of Search ................. 99/275–278, 99/323.1, 323.2, 323.3, 452, 453, 467, 470, 516, 485; 426/521; 422/112, 113, 33, 39; 137/493, 505, 484.2, 613

[56] References Cited

U.S. PATENT DOCUMENTS

| | | | |
|---|---|---|---|
| 3,737,608 | 6/1973 | Nagao et al. | 99/451 |
| 3,830,149 | 8/1974 | Kaufman | 99/452 |
| 3,877,358 | 4/1975 | Karr | 99/275 |
| 3,934,042 | 1/1976 | De Stoutz | 99/453 |
| 4,068,010 | 1/1978 | Karr | 426/521 |
| 4,323,004 | 4/1982 | Sereda et al. | 137/93 |
| 4,419,301 | 12/1983 | Nahra et al. | 99/467 |
| 4,809,597 | 3/1989 | Lin | 99/483 |
| 5,012,727 | 5/1991 | Pesente | 99/275 |
| 5,014,612 | 5/1991 | Gresch | 99/276 |
| 5,049,400 | 9/1991 | Hayden | 422/20 |

Primary Examiner—Timothy F. Simone
Attorney, Agent, or Firm—Wenderoth, Lind & Ponack

[57] ABSTRACT

A continuous pressurizing apparatus for liquid comprises a plurality of cylinders arranged in parallel and having liquid chambers, of which maximum effective volumes are slightly different from each other, each of the cylinders being provided with a rod and a pair of pistons which are provided at opposite ends of the rod and are slidably fitted into the cylinder to form the liquid chamber; an inlet passage connected to an inlet/outlet path which is in communication with one of the liquid chambers of each cylinder; and outlet passage connected to the inlet/outlet path which is in communication with the other liquid chamber of each cylinder; selector valves disposed at each of the inlet passage and the outlet passage, which are formed on both sides of the connecting portion of the inlet/outlet path, the rods in the cylinders being operated in accordance with procedure of selection by the selector valves such that the pressure of the liquid is increased by sequentially transferring supplied liquid through the inlet passage from the liquid chamber of the lower cylinder to the liquid chamber of the adjacent higher cylinder and that, in synchronization with the pressure increasing operation, the pressure of the liquid is reduced by sequentially transferring the liquid through the outlet passage from the liquid chamber of the higher cylinder to the liquid chamber of the adjacent lower chamber cylinder; and a pressure container accommodating an expandable tube, which has opposite ends connected to the inlet passage and the outlet passage, respectively.

4 Claims, 3 Drawing Sheets

CONTINUOUS PRESSURIZING APPARATUS FOR LIQUID

BACKGROUND OF THE INVENTION

1. Field of the Invention

The present invention relates to a continuous pressurizing apparatus for liquid used for pressure sterilization of liquid to be treated such as beverage.

2. Description of the Related Art

FIG. 4 shows a method for applying the pressurizing sterilization to the liquid to be treated in the prior art. As shown in the figure, the liquid to be treated is supplied through a supply pipe 12 into a pressure container 11, and then a valve 14' is closed. Thereafter, a pressure in the container is increased by a high pressure pump 13, and then a valve 14 is closed. This pressurized state is maintained for a predetermined time period, whereby the pressure treatment is applied to the liquid. After the treatment, the valve 14' is opened to reduce the pressure. Also, pressurized air is supplied into the container 11 through a sterile or disinfected air pipe 12'' and is externally discharged through a discharge pipe 12'. For the next treatment, the treated liquid is completely discharged, and then new untreated liquid is supplied into the container for repeating the same process.

FIG. 5 shows another prior art, in which the high pressure pump 13 continuously forces the untreated liquid into a high pressure pipe 15 for pressurizing it. The treatment is completed by maintaining the liquid at a high pressure for a predetermined time period.

Since the pressure sterilization method in the prior art shown in FIG. 4 is a batch processing, a high pressure (generally, of 2000–4000 kg/cm$^2$) repetitively acts on the pressure container 11 at respective processes. This may cause a low frequency fatigue in the pressure container 11, resulting in a problem relating to a fatigue strength. The method shown in FIG. 5 requires a thin pressure pipe 15 to be disposed through a long length, which increases a cost of facility. Also a problem relating to erosion of the valve 14' may be caused, because the pressure is reduced from a high value by the valve 14'. Further a running cost is twelve to twenty times as much as that of the method in FIG. 4, because the energy is not recovered.

Accordingly, it is an object of the invention to provide an apparatus, overcoming the above-noted problems.

SUMMARY OF THE INVENTION

A continuous pressurizing apparatus for liquid according to the invention comprises a plurality of cylinders arranged in parallel and having liquid chambers, of which maximum effective volumes are slightly different from each other, each of the cylinders being provided with a rod and a pair of pistons which are provided at opposite ends of the rod and are slidably fitted into the cylinder to form the liquid chamber; an inlet passage connected to an inlet/outlet path which is in communication with one of the liquid chambers of each cylinder; an outlet passage connected to the inlet/outlet path which is in communication with the other liquid chamber of each cylinder; selector valves disposed at each of the inlet passage and the outlet passage, which are formed on both sides of the connection portion of said inlet/outlet path, the rods in the cylinders being operated in accordance with procedure of selection by the selector valves such that the pressure of the liquid is increased by sequentially transferring supplied liquid through the inlet passage from the liquid chamber of the lower cylinder to the liquid chamber of the adjacent higher cylinder and that, in synchronization with the pressure increasing operation, the pressure of the liquid is reduced by sequentially transferring the liquid through the outlet passage from the liquid chamber of the higher cylinder to the liquid chamber of the adjacent lower chamber cylinder; and a pressure container accommodating an expandable tube, which has opposite ends connected to the inlet passage and the outlet passage, respectively.

When the rod is operated, and thus a pair of the pistons move, the liquid in the liquid chamber of the lower cylinder at the pressure increasing side flows through the inlet passage into the liquid chamber of the higher cylinder in accordance with the selection procedure of the selection valves provided in the inlet and outlet passages. Since the lower liquid chamber has the volume larger than that of the higher liquid chamber, the liquid is compressed to have a higher pressure during the transfer. Also, the liquid in the liquid chamber of the higher cylinder at the pressure reducing side flows through the outlet passage into the liquid chamber of the lower cylinder. In this operation, the volume is increased and thus the pressure of the liquid is reduced for the similar reason. In these pressure increasing and reducing operations, since the pressures act on the opposite ends of the rods, forces for moving the rods are required only to correspond to the pressure differences. The total force for moving the rods in both the higher and lower cylinders is equal to a value of (pressure difference)×{(cross sections of lower cylinders)−(cross sections of higher cylinders)}, which improves an energy recovery efficiency. The operations for increasing and reducing the pressures are carried out by moving the liquid to the higher and lower cylinders, and the pressure is changed to a predetermined higher value or an atmospheric pressure. The pressure variation is small, and the fatigue durability is remarkably improved.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
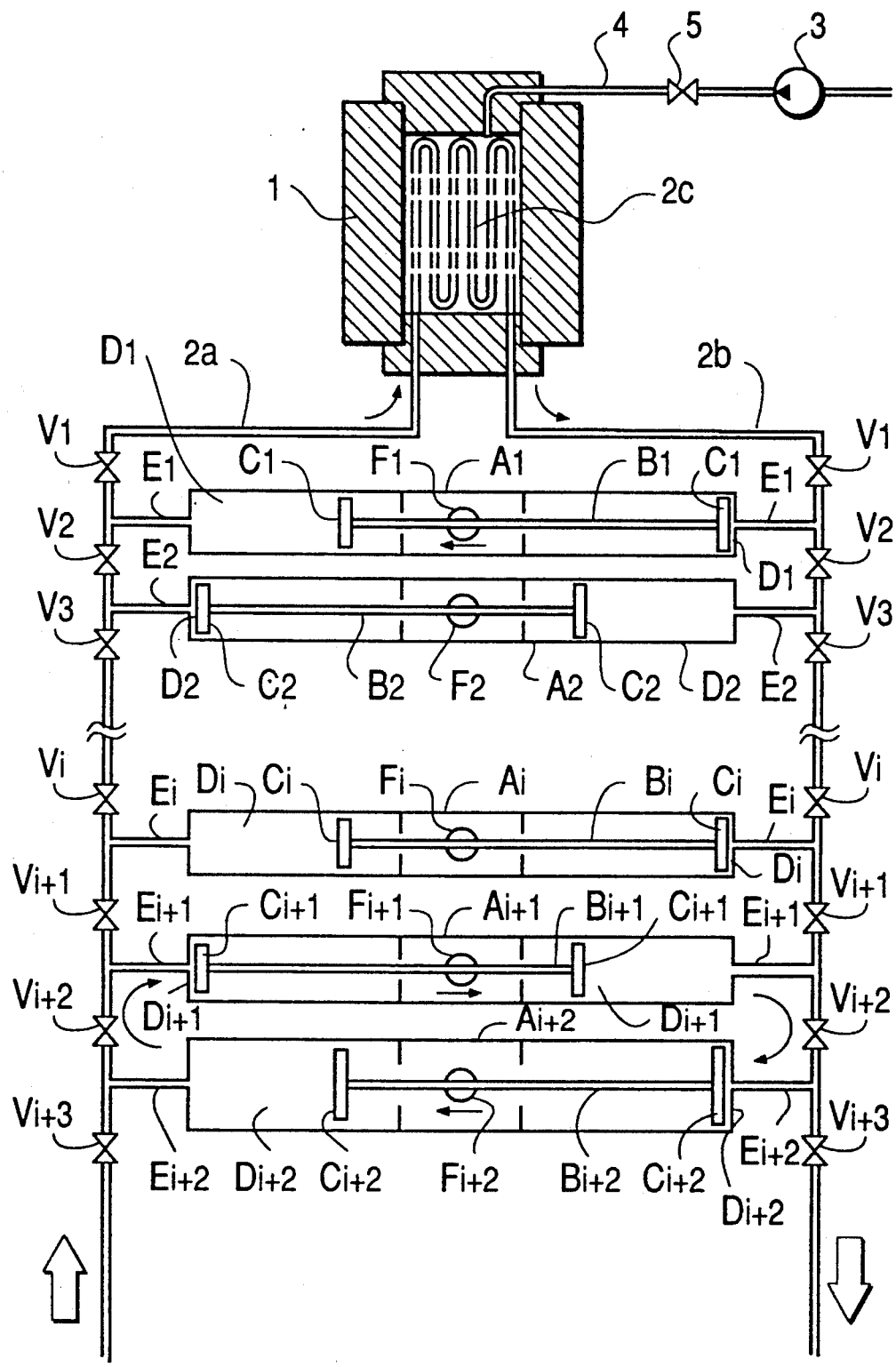
FIG. 1 is a piping diagram of a continuous pressurizing apparatus for liquid according to a first embodiment of the invention.
Figure 2:
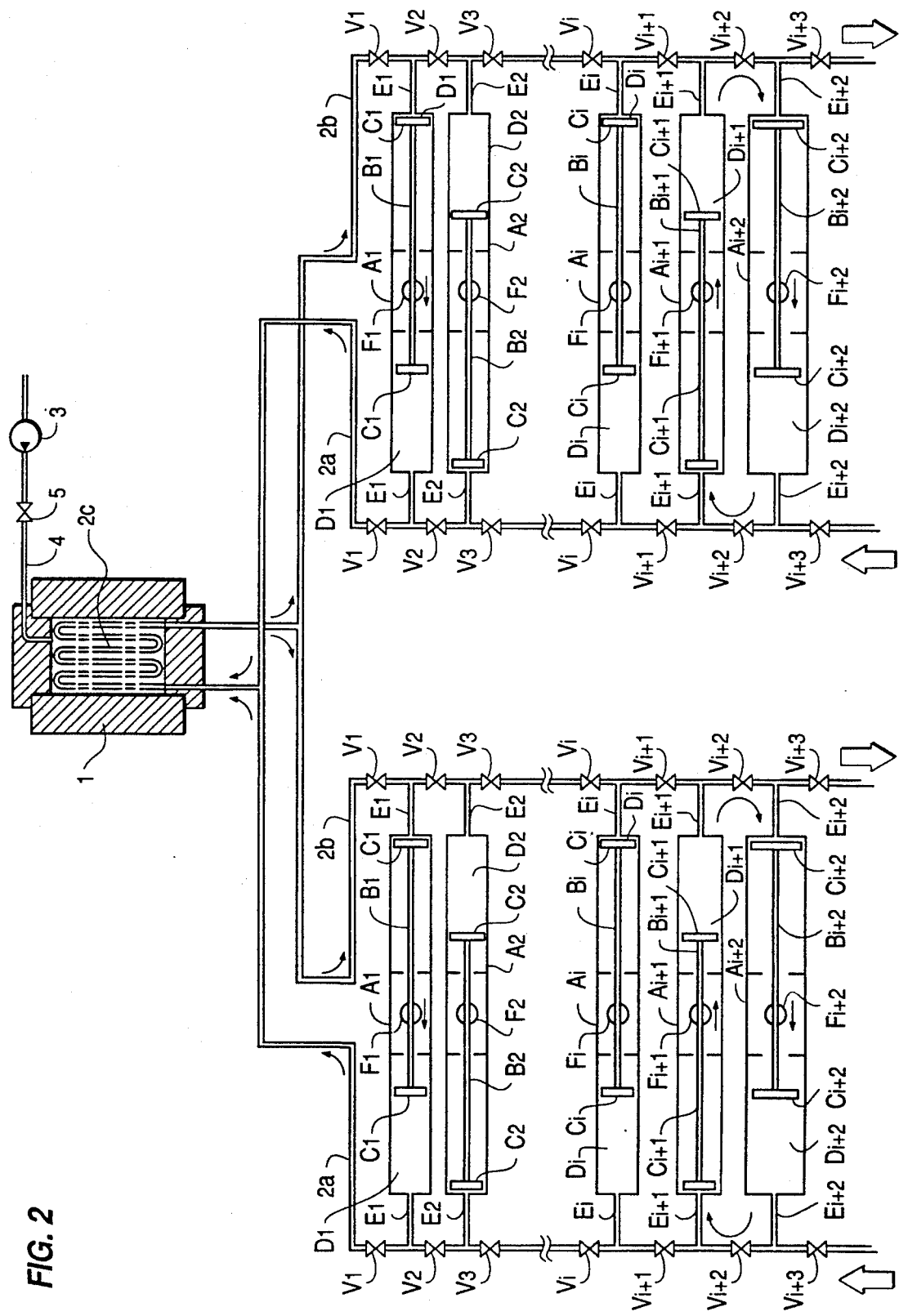
FIG. 2 is a piping diagram of a continuous pressurizing apparatus for liquid according to a second embodiment of the invention.

Preferred embodiments of the invention will be described below with reference to the drawings. FIGS. 1 and 2 show first and second embodiments of the invention, respectively. Referring to FIG. 1, references characters $A_1$, $A_2$ ... $A_i$, $A_{i+1}$ and $A_{i+2}$ indicate cylinders, into which pairs of pistons $C_1$, $C_2$ ... $C_i$, $C_{i+1}$ and $C_{i+2}$ provided at opposite ends of rods $B_1$, $B_2$ ... $B_i$, $B_{i+1}$ and $B_{i+2}$ are slidably fitted to define pairs of liquid chambers $D_1$, $D_2$ ... $D_i$, $D_{i+1}$ and $D_{i+2}$, respectively. Maximum effective volumes of the liquid chambers of these cylinders (i.e., products of bore cross sections a of the cylinders and maximum strokes l of the pistons) slightly differ from each other. The cylinders are disposed in parallel to each other and are aligned in the order of the maximum effective volume so that, in the illustrated embodiment, the lower cylinder has the larger maximum effective volume than the higher cylinder.

The liquid chambers of the cylinders are communicated to inlet/outlet paths $E_1$, $E_2$ ... $E_i$, $E_{i+1}$ and $E_{i+2}$, respectively. The inlet/outlet paths at one side are connected to an inlet passage $2a$, and the inlet/outlet paths at the other side are connected to an outlet passage $2b$. On both sides of each connecting portion of the inlet/outlet paths with the passages $2a$ and $2b$, the inlet and outlet passages $2a$ and $2b$ are provided with selector valves $V_1$, $V_2$ ... $V_i$, $V_{i+1}$ and $V_{i+2}$, respectively.

A pressure container 1 is disposed at a higher side of the cylinder array. The container 1 accommodates an expandable tube $2c$ made from polytetrafluoroethylene in a substantially zigzag or spiral form. One end of the tube $2c$ is connected to the inlet passage $2a$, and the other end thereof is connected to the outlet passage $2b$. A pipe 4 for water passage is connected to the pressure container 1, so that the container 4 may be filled with water by driving a pump 3 capable of pressurizing the water to a high pressure. Rods $B_1$, $B_2$ ... $B_i$, $B_{i+1}$ and $B_{i+2}$ in the cylinders are connected to unillustrated driving devices through mounting portions $F_1$, $F_2$ ... $F_i$, $F_{i+1}$ and $F_{i+2}$, so that the driving devices may be driven to operate the rods and thus the piston pairs, respectively.

Figure 3:
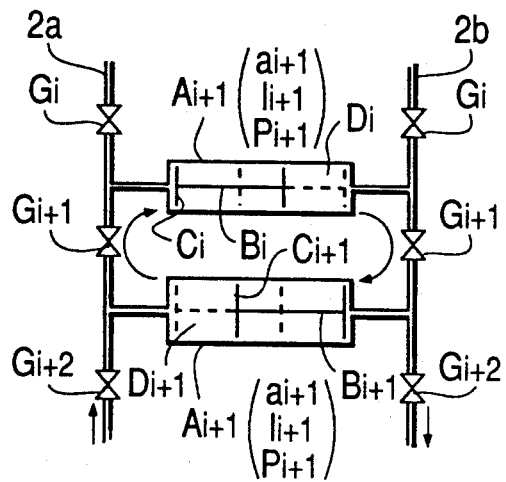
FIG. 3 is a view for illustrating a principle for increasing and reducing a pressure in a continuous pressurizing apparatus for liquid of the invention.
Figure 4:
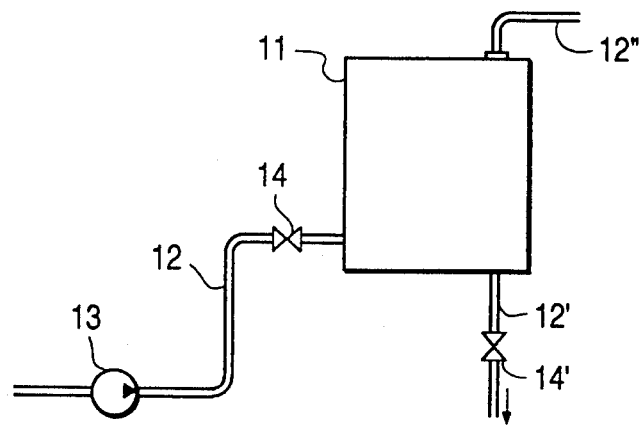
FIG. 4 is a piping diagram of an example of a pressurizing apparatus for liquid in the prior art.
Figure 5:
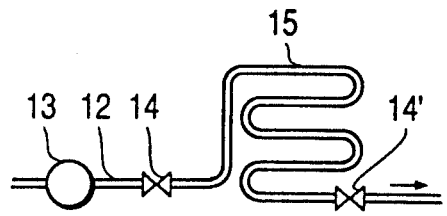
FIG. 5 is a piping diagram of another example of a pressurizing apparatus for liquid in the prior art.

The principle for increasing and reducing the pressure of the continuous pressure apparatus of the invention will be described below. In general, when a pressure acting on liquid having an initial volume V increases by $\Delta p$ and the volume reduces by $\Delta V$, a following relationship is established.

$$\Delta V/V = \Delta p \cdot \beta$$

wherein $\beta$ is a compressibility of the liquid. Referring to FIG. 3, it is assumed that the adjacent two cylinders $A_i$ and $A_{i+1}$ have the cross sections $a_i$ and $a_{i+1}$ and the maximum effective strokes $l_1$ and $l_2$, respectively, and the liquid to be treated, which is filled in the liquid chamber $D_{i+1}$ of the lower cylinder $A_{i+1}$ through the inlet passage $2a$, has the pressure of $p_{i+1}$ (in this case, the piston $C_i$ in the higher cylinder $A_i$ is located at the inlet side, the liquid chamber $D_i$ at the inlet side is not filled with the liquid to be treated, and the liquid chamber $D_i$ at the outlet side is filled with the treated liquid). In this condition, the selector valves $G_i$ and $G_{i+2}$ in the inlet and outlet passages $2a$ and $2b$ are closed, the selector value $G_{i+1}$ is opened, and the pistons $C_i$ and $C_{i+1}$ are moved in the directions opposite to each other through the maximum strokes $l_i$ and $l_{i+1}$ by means of the rods $B_i$ and $B_{i+1}$, respectively. Thereby, at the inlet side, the liquid to be treated in the liquid chamber $D_{i+1}$ of the lower cylinder $A_{i+1}$ is fully transferred to the liquid chamber $D_i$ of the higher cylinder $A_i$. It is assumed that the liquid pressure of the liquid chamber $D_i$ has a value of $p_i$ in this condition. In this case, a following relationship is established.

$$(a_{i+1} \cdot l_{i+1} - a_i \cdot l_i)/a_{i+1} + l_{i+1} = (p_i - p_{i+1}) \cdot \beta$$

Accordingly, in accordance with the compressibility $\beta$, when the maximum effective volume ($V_i = a_i \cdot l_i$) of the liquid chamber $D_i$ of the higher cylinder $A_i$ may be determined smaller than the maximum effective volume ($V_{i+1} = a_{i+1} \cdot l_{i+1}$) of the liquid chamber $D_{i+1}$ of the lower cylinder $A_{i+1}$ by an appropriate amount, the liquid pressure can be increased by $p_i - p_{i+1}$ between the adjacent liquid chambers.

In connection with the outlet passage, the treated liquid of the volume ($V_i = a_i \cdot l_i$) filled in the liquid chamber $D_i$ of the higher cylinder $A_i$ is fully transferred to the liquid chamber $D_{i+1}$ of the lower cylinder $A_{i+1}$ having the volume ($V_{i+1} = a_{i+1} \cdot l_{i+1}$), so that the liquid pressure is lowered by a value of $p_i - p_{i+1}$ between the adjacent liquid chambers.

In this manner, the liquid to be treated which is supplied from the inlet of the inlet passage $2a$ is fed into the liquid chamber of the lowermost cylinder, and then the liquid is sequentially transferred to the liquid chambers of the upper cylinders by driving the respective pistons in accordance with the selecting operations of the selector valves. The liquid pressure is gradually increased by each transfer operation, and the liquid which is ultimately pressurized to the predetermined value is fed into the tube $2c$ in the pressure container 1 filled with the water. The pressure treatment in the tube $2c$ continues for a predetermined time period until the liquid reaches the outlet. The pressure-treated liquid is supplied into the liquid chamber of the highermost cylinder through the outlet passage $2b$, and then is sequentially transferred to the liquid chambers of the lower cylinders in synchronization with the pressurizing operation at the inlet side. The liquid pressure gradually reduces at each transfer operation. Ultimately, the liquid is discharged from the outlet of the outlet passage $2b$. The volume ratios of the respective cylinders or the number of the cylinders may be appropriately determined in view of the compressibility of the liquid to be treated, the pressure of the pressure treatment, etc.

Also, in the illustrated embodiment, one array of the cylinders $A_1$, $A_2$ ... $A_i$, $A_{i+1}$ and $A_{i+2}$ is associated to the one pressure container 1. In this case, the liquid intermittently flows through the respective passages. Accordingly, two cylinder arrays, each of which includes the cylinders of the same specification and structure (but may include the cylinders different from those of the other array), may be provided so that the liquid may be continuously supplied into the pressure container 1 at a constant rate, which improves the process efficiency.

In the present invention, as described hereinabove, the paired pistons $C_1$ ... $C_{i+2}$ provided at the opposite ends of the rods $B_1$ ... $B_{i+2}$ and the cylinders $A_1$ ... $A_{i+2}$ form paired liquid chambers $D_1$ ... $D_{i+2}$ having the maximum effective volumes which are slightly different from each other, respectively. The cylinders having the liquid chambers $D_1$ ... $D_{i+2}$ are disposed in parallel. The inlet/outlet paths $E_1$ ... $E_{i+2}$ of one of the liquid chambers $D_1$ ... $D_{i+2}$ of each cylinder are connected to the inlet passage $2a$, and the inlet/outlet paths $E_1$ ... $E_{i+2}$ of the other liquid chamber are connected to the outlet passage $2b$. By driving the rods $B_1$ ... $B_{i+2}$ to move the paired pistons $C_1$ ... $C_{i+2}$, the liquid in the liquid chamber of the lower cylinder at the pressure increasing side flows into the liquid chamber of the higher cylinder through the inlet passage 2a in accordance with the selecting procedure of the selector valves $V_1 \ldots V_{i+2}$ provided in the inlet and outlet passages. Since the volume of the lower liquid chamber is larger than that of the higher liquid chamber, the liquid is compressed and pressurized during the transfer. Similarly, the liquid in the liquid chamber of the upper cylinder at the pressure reducing side flows through the outlet passage 2b into the liquid chamber of the lower cylinder. In this operation, the volume increases, and the pressure is reduced.

In these pressure increasing and reducing operations, since the pressures act on the opposite ends of the rods $B_1 \ldots B_{i+2}$, the forces for moving the rods $B_1 \ldots B_{i+2}$ are required only to correspond to the pressure differences. The total force for moving the rods in both the higher and lower cylinders is equal to the value of (pressure difference)×{(cross sections of lower cylinders)−(cross sections of higher cylinders)}, which improves an energy recovery efficiency. The operations for increasing and reducing the pressures are carried out by moving the liquid to the higher and lower cylinders, and the pressure is changed to the predetermined higher value or to the atmospheric pressure. The pressure variation is small, and the fatigue durability is remarkably increased.

The liquid flows intermittently in the embodiment in FIG. 1, as described before. In the embodiment including two or more cylinder arrays, as shown in FIG. 2, the intermittent flows cancels each other, resulting in continuous flows. Further, the expandable tube 2c, which has the inlet and outlet connected to the passages and accommodates the liquid to be held under the high pressure for a predetermined time period, is disposed in the pressure container 1 filled with the water. The pressurized liquid flows from the inlet of the pressure container 1 through the expandable tube 2c. Since the high pressure is maintained also outside the tube, the tube itself is not required to have the strength against the pressure. Also the tube can be facilely bent and handled, which is different from a metal tube. Therefore, the cost can be reduced.

According to the continuous pressure apparatus of the invention, as described hereinabove, the cylinders having the liquid chamber pairs, of which volumes are slightly different from each other, are disposed in parallel. The liquid to be treated is transferred from the liquid chamber of the lower cylinder having the larger volume to the liquid chamber of the upper cylinder having the smaller volume, so that the liquid pressure is gradually increased without pulsation at each transfer operation. Therefore, the required high pressure can be facilely obtained. In synchronization with this pressure increasing operation, the treated liquid is transferred from the liquid chamber of the upper cylinder having the smaller volume to the liquid chamber of the lower cylinder having the larger volume, so that the liquid pressure is gradually reduced at each transfer operation. Therefore, the high liquid pressure can be facilely and smoothly reduced. The variations of the increasing and reducing liquid pressures caused between the cylinders are small, so that fatigue of the cylinders, passages and selector valves does not cause a substantial problem, and thus the durability of these members can be increased. The pressure increasing and reducing operations of the liquid are carried out by the cooperation of paired pistons, and specifically, the pressure increasing operation and pressure reducing operation in each cylinder assist each other. Therefore, the energy efficiency can be remarkably high. Also the fatigue durability is remarkably improved, which enables reduction of the running cost.

If the two or more cylinder arrays are disposed, the liquid in the pressure container can be continuously fed at a constant rate, resulting in the improvement of the processing efficiency. Since the expandable tube is employed inside the pressure container, an expensive high-pressure piping is not required, and thus the facility cost can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A continuous pressurizing apparatus for liquid comprising:

a plurality of cylinders arranged in parallel and having liquid chambers, of which maximum effective volumes are slightly different from each other, each of said cylinders being provided with a rod and a pair of pistons which are provided at opposite ends of said rod and are slidably fitted into said cylinder to form said liquid chamber;

an inlet passage connected to an inlet/outlet path which is in communication with one of said liquid chambers of each cylinder;

an outlet passage connected to said inlet/outlet path which is in communication with the other liquid chamber of each cylinder;

selector valves disposed at each of said inlet passage and said outlet passage, which are formed on both sides of the connection portion of said inlet/outlet path;

said rods in said cylinders being operated in accordance with procedure of selection by said selector valves such that the pressure of said liquid is increased by sequentially transferring supplied liquid through said inlet passage from said liquid chamber of said lower cylinder to said liquid chamber of said adjacent higher cylinder and that, in synchronization with the pressure increasing operation, the pressure of said liquid is reduced by sequentially transferring said liquid through said outlet passage from said liquid chamber of said higher cylinder to said liquid chamber of the adjacent lower chamber cylinder; and a pressure container accommodating an expandable tube, which has opposite ends connected to said inlet passage and said outlet passage, respectively.

2. A continuous pressurizing apparatus for liquid as claimed in claim 1, wherein said pressure container is filled with pressurized liquid.

3. A continuous pressurizing apparatus for liquid as claimed in claim 1, wherein opposite ends of said expandable tube in said pressure container are connected to a plurality of inlet passages and a plurality of outlet passages, respectively.

4. A continuous pressurizing apparatus for liquid as claimed in claim 2, wherein opposite ends of said expandable tube in said pressure container are connected to a plurality of inlet passages and a plurality of outlet passages, respectively.

* * * * *

UNITED STATES PATENT AND TRADEMARK OFFICE
CERTIFICATE OF CORRECTION

PATENT NO. :     5,165,325
DATED       :     November 24, 1992
INVENTOR(S) :    Makoto AKATSU It is certified that error appears in the above-identified patent and that said Letters Patent is hereby corrected as shown below:

On the ABSTRACT page, below item [22], the following foreign priority data has been added:

--[30]  Foreign Application Priority Data

April 17, 1991  [JP]  Japan ................. 3-110811--.

Signed and Sealed this

Twelfth Day of October, 1993

*Attest:*

BRUCE LEHMAN

*Attesting Officer*     *Commissioner of Patents and Trademarks*